(12) United States Patent
Sagane et al.

(10) Patent No.: US 6,420,449 B1
(45) Date of Patent: Jul. 16, 2002

(54) RESIN COMPOSITION FOR WHITE MARKING

(75) Inventors: Hiroshi Sagane, Sakai; Shinichiro Imanishi, Himeji; Katsuhiko Sumida, Amagasaki, all of (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/623,858

(22) PCT Filed: Jan. 21, 2000

(86) PCT No.: PCT/JP00/00270

§ 371 (c)(1),
(2), (4) Date: Sep. 11, 2000

(87) PCT Pub. No.: WO00/43448

PCT Pub. Date: Jul. 27, 2000

(30) Foreign Application Priority Data

Jan. 25, 1999 (JP) ............................................. 11-016248

(51) Int. Cl.$^7$ .................................................. C08F 2/46

(52) U.S. Cl. ............................... 522/2; 522/71; 522/81; 522/83; 522/111; 522/112; 522/110; 522/109; 523/172; 106/31.01; 106/31.35

(58) Field of Search .............................. 522/71, 81, 83, 522/111, 112, 110, 109, 2; 523/172; 106/31.01, 31.35

(56) References Cited

U.S. PATENT DOCUMENTS

| 5,300,350 A | * | 4/1994 | Grosser et al. |
| 5,489,639 A | * | 2/1996 | Faber et al. |
| 5,760,120 A | | 6/1998 | Itoh et al. |
| 5,792,807 A | * | 8/1998 | Hayashihara et al. |
| 5,981,647 A | * | 11/1999 | Okamoto et al. |

FOREIGN PATENT DOCUMENTS

| JP | A5645926 | 4/1981 |
| JP | A6381117 | 4/1988 |
| JP | B2247314 | 10/1990 |
| JP | A4267191 | 9/1992 |
| JP | A525317 | 2/1993 |
| JP | A825806 | 1/1996 |
| JP | A8120133 | 5/1996 |
| JP | A8333503 | 12/1996 |

* cited by examiner

*Primary Examiner*—Susan W. Berman
(74) *Attorney, Agent, or Firm*—Birch, Stewart, Kolasch & Birch, LLP

(57) ABSTRACT

A resin composition comprises a thermoplastic resin, a non-terpene-series higher fatty acid or a derivative thereof and a black pigment. As the higher fatty acid or derivative thereof, use can be made of, for example, a saturated higher fatty acid having about 12 to 30 carbon atoms or a metal salt thereof. As the thermoplastic resin, use can be made of, for example, an acrylic resin A and a styrenic resin B. As the black dye or pigment, use can be made of, for example, carbon black. The resin composition may contain a dye or pigment such as titanium oxide. A clearly defined white marking is developed on the above resin composition by laser irradiation.

23 Claims, No Drawings

RESIN COMPOSITION FOR WHITE MARKING

This application is the national phase under 35 U.S.C. §371 of PCT International Application No. PCT/JP00/00270 which has an International filing date of Jan. 21, 2000, which designated the United States of America.

TECHNICAL FIELD

The present invention relates to a resin composition for white marking which can form a white marking by irradiating laser beams, particularly, a resin composition which has not only excellent white-marking properties, but also a remarkable molding processability and impact resistance, and is available at an inexpensive price as well as recyclable. To be more specific, the present invention relates to a resin composition for white marking which is useful for a production of a molded article whose surface can be marked with recognizable or legible white letters or figures (e.g. key caps of a keyboard, button parts of a motorcar) by irradiating laser beams with a wavelength of, for instance, 1064 nm thereon.

BACKGROUND ART

It is a common practice to print letters, designs, figures and the like on the surface of a molded resin article. The printing is performed by a variety of known techniques, from those using paints such as pad printing and impregnation printing, to a printing technique by means of laser beam irradiation (hereinafter, mentioned as laser marking). Although the methods using a paint are most widely employed for such printing, the processes have disadvantages: high processing cost, fears of environmental pollution by solvents, less possibility of recycling, etc. On the other hand, laser marking is a cheaper and more efficient method than the painting techniques owing to its simple marking process. Laser marking ensures excellent durability of the printed materials, thus being highly valuable in industrial applications. As a result, many techniques have been suggested for laser marking. For instance, Japanese Patent Application Laid-Open No. 45926/1981 (JP-A-56-45926) teaches a technology for marking the surface of a molded resin article made of a resin blended with a filler discolourisable by laser beam irradiation.

An example of the molded articles to be printed with letters and figures by laser marking includes a keyboard of a personal computer. Main printing methods for the surface of a keyboard used to be pad printing onto an acrylonitrile-butadiene-styrene copolymer (an ABS resin) and impregnation printing onto polybutylene terephthalate (a PBT resin). However, in consideration of environmental problems inclusive of recycling as well as the factor of the cost, the marking method comprising irradiation of laser beams by using an Nd:YAG laser or other lasers on an ABS resin has been replacing the above processes.

On the one hand, a black or dark-coloured marking is generally effective on a molded article coloured in light gray, cream or other colours having a high brightness or lightness. On the other hand, the black-marking does not stand out on a black or dark-coloured article. In the case of the latter, letters and figures should be printed in white or a whitish colour (hereinafter, referred to as a white marking). However, it is usually impossible to develop a white marking on an ABS resin by irradiation of laser beams.

Japanese Patent Publication No. 47314/1990 (JP-B-2-47314) discloses a marking technique for resins. The technique comprises irradiating laser beams on the surface of a thermoplastic resin such as an acrylic resin, whereby the irradiated part foams and lifts up to form a white-marked section. As methods of making a white marking on the surface of resins, there are other known methods which comprise incorporating, into a resin, titanium black [Japanese Patent Application Laid-Open No. 81117/1988 (JP-A-63-81117), and Japanese Patent Application Laid-Open No. 25806/1996 (JP-A-8-25806)], cordierite and/or mica [Japanese Patent Application Laid-Open No. 267191/1992 (JP-A-4-26719/l)], aluminium hydroxide [Japanese Patent Application Laid-Open No. 25317/1993 (JP-A-5-25317)], and other inorganic compounds.

Moreover, Japanese Patent Application Laid-Open No. 120133/1996 (JP-A-8-120133) discloses a resin composition for white laser marking obtained by allowing an aromatic vinyl compound, a vinyl cyanide compound, a (meth)acrylate, maleic anhydride, maleimide and the like to polymerize in the presence of a rubber. This literature also describes the use of Titan Black, black iron oxide, yellow iron oxide or the like as a dye or pigment. Further, Japanese Patent Application Laid-Open No. 333503/1996 (JP-A-8-333503) discloses a resin composition for laser marking composed of the resin described in the above patent application [Japanese Patent Application Laid-Open No. 120133/1996 (JP-A-8-120133)], a flame retarder and a colouring agent such as Titan Black, carbon black and titanium white. In the Examples of these literatures, a rosined soap is used when producing resins.

However, the use of such resin compositions is still impractical in terms of the whiteness and quality of the marked letters and figures, and it is difficult to highly improve whiteness.

It is therefore an object of the present invention to provide a resin composition for white marking which can develop a clear white marking by irradiating laser beams and a molded article which is laser-markable in white formed with the resin composition.

It is another object of the present invention to provide a resin composition for white marking which can improve the whiteness of a mark without deteriorating the impact resistance of the molded article and a molded article which is laser-markable in white formed with the resin composition.

It is a further object of the present invention to provide a resin composition for white marking on which a marking can be made with high whiteness even when the irradiation energy intensity of laser beams is low and a molded article which is laser-markable in white formed with the resin composition, and a method for forming a white marking on the molded article.

A still further object of the present invention is to provide a resin composition for white marking which has good molding processability.

DISCLOSURE OF INVENTION

The inventors of the present invention have worked hard on the subject in order to achieve the above objects, and finally discovered that a molded article which is made of a resin composition containing a specific higher fatty acid or a derivative thereof can develop a remarkably distinct white marking in response to irradiation of laser beams. The present invention is based on the above findings.

In other words, the present invention provides a resin composition for white marking which comprises a thermoplastic resin, a non-terpene-series higher fatty acid or a derivative thereof and a black dye or pigment, and which can be marked in white by irradiation of laser beams.

The higher fatty acid or a derivative thereof may be a higher fatty acid having 12 to 30 carbon atoms or a metal salt of a saturated higher fatty acid. Moreover, the above resin composition may comprises an acrylic resin and a styrenic resin. The amount of the higher fatty acid or a derivative thereof is about 0.01 to 2 parts by weight relative to 100 parts by weight of the thermoplastic resin. The above resin composition may further comprise a non-black dye or pigment (e.g., a white dye or pigment such as titanium oxide).

As the acrylic resin, use can be made of, for example, a homopolymer or copolymer of a (meth)acrylic acid $C_{1-10}$alkyl ester such as poly(methyl methacrylate). As the styrenic resin, use can be made of, for example, a rubber-modified styrenic resin such as an acrylonitrile-butadiene-styrene copolymer or a mixture of an acrylonitrile-butadiene-styrene copolymer and an acrylonitrile-styrene copolymer. As the black dye or pigment, use can be made of, for example, carbon black having a mean particle size of about 10 to 90 nm.

The present invention also includes a molded article formed with the above resin composition and a method for forming a white marking on the molded article.

Throughout the present specification, acrylic resins and methacrylic resins are generalized by the term "acrylic resin". It should also be understood that acrylic acid and methacrylic acid may be generically called "(meth)acrylic acid", and that acrylic acid esters and methacrylic acid esters may be called "(meth)acrylic acid ester."

BEST MODE FOR CARRYING OUT THE INVENTION

The resin composition of the present invention can give a marking having brighter whiteness because it contains a non-terpene-series higher fatty acid or a derivative thereof.
[Higher Fatty Acid or a Derivative Thereof]

The higher fatty acid is not particularly restricted and may be a saturated or unsaturated one as far as being non terpenic or non-terpene-series. Usually, a saturated higher fatty acid is employed.

Examples of the higher fatty acid include saturated aliphatic monocarboxylic acids having about 8 to 30 carbon atoms [for example, about 10 to 30 carbon atoms, preferably about 12 to 30 carbon atoms (e.g., about 12 to 28 carbon atoms), more preferably about 14 to 24 carbon atoms (e.g., about 16 to 22 carbon atoms)] such as octylic acid, lauric acid, myristic acid, palmitic acid, stearic acid and behenic acid; unsaturated higher $C_{8-30}$monocarboxylic acids such as oleic acid, linoleic acid, linolenic acid and eleostearic acid (preferably unsaturated $C_{14-30}$monocarboxylic acids and more preferably unsaturated $C_{16-22}$monocarboxylic acids): aliphatic saturated or unsaturated hydroxy acids such as ricinolic acid and sabinic acid; aliphatic saturated or unsaturated monocarboxylic acids having a cyclic group (e.g., cycloalkyl group) such as naphthenic acid; and branched aliphatic saturated or unsaturated monocarboxylic acids such as 2-ethylhexenoic acid. Preferred higher fatty acids are fatty acids having 12 to 28 carbon atoms, preferably about 14 to 24 carbon atoms and specifically about 16 to 22 carbon atoms such as stearic acid and behenic acid. The saturated aliphatic monocarboxylic acids are preferred.

Examples of the derivative of the higher fatty acid include salts, esters and amides of the higher fatty acid. As the salts of the higher fatty acid, there may be exemplified, various metal salts, such as salts of Group Ia metals (e.g., sodium, potassium, rubidium and cesium), Group IIa metals (e.g., beryllium, magnesium, calcium, strontium and barium), Group VIII metals (e.g., iron, nickel and cobalt), Group Ib metals (e.g., copper, silver and gold), Group IIb metals (e.g., zinc and cadmium), Group IIIb metals (aluminum, gallium, indium), Group IVb metals (e.g., germanium, tin and lead) of the Periodic Table of Element. Preferred metal salts are polyvalent metal salts such as metal salts of Group IIa metals such as magnesium, calcium and barium, Group Ib metals such as copper, Group IIb metals such as zinc, Group IIIb metals such as aluminum and Group IVb metals such as lead of the Periodic Table of Elements. Such salts may be employed singly or in combination.

As a preferred higher fatty acid salt, there may be mentioned, for example, a salt of a saturated aliphatic monocarboxylic acid having about 12 to 28 carbon atoms (specifically about 16 to 22 carbon atoms) such as stearic acid with a polyvalent metal (e.g., alkali earth metals such as magnesium, calcium and barium; metals such as copper, zinc, aluminum and lead).

Examples of the ester of the higher fatty acid include esters of the above higher fatty aliphatic acid with a saturated or unsaturated $C_{1-30}$alcohol. As alcohols, there may be mentioned, for example, higher monohydric $C_{10-30}$alcohols such as cetyl alcohol, ceryl alcohol and myricyl alcohol (especially, higher monohydric $C_{14-26}$alcohols); polyhydric alcohols such as glycol, glycerin and diglycerin. As preferred higher fatty esters, there may be mentioned, for example, esters of saturated or unsaturated higher $C_{14-28}$ fatty acids such as palmitic acid and stearic acid with higher monohydric $C_{14-22}$alcohols (e.g., cetyl palmitate, myricyl palmitate and ceryl stearate); esters of saturated or unsaturated higher $C_{14-28}$fatty acids with polyhydric alcohols (e.g., glycerin) (e.g., monoglycerides such as monopalmitin and monostearin; diglycerides such as distearin; triglycerides such as tristearin and palmidistearin).

Examples of the aliphatic acid amide include amides corresponding to the above higher fatty acid, such as stearic acid amide.

The amount of the higher fatty acid or a derivative thereof is about 0.01 to 2 parts by weight, preferably about 0.05 to 1.8 parts by weight, more preferably about 0.1 to 1.5 parts by weight relative to 100 parts by weight of the thermoplastic resin. In the case where the amount of the higher fatty acid is less than 0.01 part by weight, the whiteness of a marking is not sufficiently improved. In the case of an amount exceeding 2 parts by weight, the resin is softened, leading to products unsatisfactory in, e.g., rigidity and heat resistance.
[Thermoplastic Resin]

A variety of thermoplastic resins can be used as far as they are white-markable, and there is no specific restriction as to the choice. Specifically, at least one member selected from acrylic resins A and styrenic resins B, among them, a resin composition comprising the combination of an acrylic resin A and a styrenic resin B is preferred.

(Acrylic Resin A)

The acrylic resin A includes a homo- or co-polymer which contains, as the constitutive monomer, at least one monomer selected from acrylic monomers including (meth)acrylic acids and (meth)acrylic acid esters. The role of the acrylic resin A is to foam up in response to irradiation of laser beams (e.g. wavelength 1064 nm) and develop a white marking on the surface of a molded article.

As the (meth)acrylic acid esters, there may be mentioned methyl acrylate, ethyl acrylate, propyl acrylate, butyl acrylate, t-butyl acrylate, hexyl acrylate, 2-ethylhexyl acrylate, and corresponding methacrylic acid esters and other alkyl (meth)acrylates [e.g. $C_{1-10}$alkyl (meth)acrylates], preferably $C_{1-6}$alkyl (meth)acrylates [in particular, $C_{1-4}$alkyl (meth)acrylates such as methyl methacrylate and butyl acrylate]. Such (meth)acrylates can be used singly or in combination. Preferred as the (meth)acrylate is methyl methacrylate or a combination comprising at least methyl methacrylate.

The copolymer may comprise a monomer other than the acrylic monomer as the constitutive monomer. Such a monomer needs only to be co-polymerizable with the acrylic monomer, and includes, for instance, vinyl ester monomers such as vinyl acetate, styrenic monomers to be named below, vinyl cyanide-series monomers, maleic anhydride and imide-series monomers.

The acrylic resin A may contain a rubber component. The rubber component includes, for instance, polybutadiene, a butadiene-styrene copolymer, polyisoprene, a butadiene-acrylonitrile copolymer, an isobutylene-isoprene copolymer, an ethylene-propylene rubber, an acrylic rubber (e.g., poly (butyl acrylate)), a urethane rubber, a silicon rubber, butyl rubber and the like. The rubber component can be incorporated into the acrylic resin A by blending, or by copolymerization such as graft copolymerization and block copolymerization.

Examples of the desirable acrylic resin A include poly (methyl methacrylate); and polymers containing methyl methacrylate as the constitutive monomer, such as methyl methacrylate-(meth)acrylic acid copolymer, methyl methacrylate-acrylic acid $C_{1-4}$alkyl ester copolymer, a methyl methacrylate-styrene copolymer and a methyl methacrylate-butadiene-styrene copolymer. From the standpoints of a balance of white-marking properties, mechanical strength, expenses, and compatibility with the styrenic resin, it is especially favorable to select poly(methyl methacrylate), methyl methacrylate-methyl acrylate copolymer. These acrylic resins A can be used alone or in combination.

The number average molecular weight of the acrylic resin A is, for instance, about 50,000 to 150,000, and preferably about 60,000 to 120,000. Where the number average molecular weight is less than 50,000, the impact resistance is apt to decrease. In addition, the resin composition is likely to suffer from a decrease in strength and inferior external appearances such as flow marks, due to its insufficient compatibility with the styrenic resin. On the other hand, an acrylic resin with a number average molecular weight of more than 150,000 gives the resin composition an excessively high melt viscosity, thereby sacrificing the moldability.

The acrylic resin can be produced by allowing the above monomer to polymerize according to any of a variety of polymerization methods, as emulsion polymerization, suspension polymerization, solution polymerization and bulk polymerization.

(Styrenic Resin B)

The styrenic resin B need only contain at least one styrenic monomer as the constitutive monomer, and may be either of a homopolymer or a copolymer. The styrenic resin B, which cannot show white-marking properties by itself, imparts remarkable marking-accelerating effect when used in combination with the acrylic resin A. The styrenic resin B enables the acrylic resin A to show its white-marking properties by irradiation of laser beams at a lower intensity, in comparison with the single use of the acrylic resin A. Further, the styrenic resin B is highly compatible with the acrylic resin A, and imparts a high impact resistance and excellent moldability to the resin composition.

The styrenic resin includes styrene, an alkyl-substituted styrene (e.g., vinyltoluenes such as o-methylstyrene, m-methylstyrene, p-methylstyrene), a halogen-substituted styrene (e.g. o-chlorostyrene, p-chlorostyrene, o-bromostyrene), an α-alkyl-substituted styrene having an alkyl substituent in an α-position (e.g., αmethylstyrene, α-ethylstyrene) and the like. Styrene, vinyltoluenes and α-methylstyrene are particularly preferred among these.

The styrenic resin B may contain a monomer other than the styrenic monomer as the constitutive monomer. Such monomers include monomers copolymerizable with the styrenic monomer, such as vinyl cyanide monomers, maleic anhydride, imide-series monomers and the aforesaid acrylic monomers. The vinyl cyanide-series monomers include acrylonitrile and methacrylonitrile. The imide-series monomers include an N-alkyl-maleimide (e.g. N-methyl-maleimide, N-ethyl-maleimide), an N-cycloalkyl-maleimide (e.g. N-cyclohexyl-maleimide), an N-aryl-maleimide [e.g. N-phenyl-maleimide, N-(2-methylphenyl)maleimide] and so on. Preferred as the copolymerizable monomer is acrylonitrile, maleic anhydride or imide-series monomer. As the monomer, a monomer containing at least acrylonitrile is preferred. The content of acrylonitrile relative to the whole monomer(s) may be selected from within the range of about 8 to 30% by weight.

Additionally, the styrenic resin B may contain a rubber component. Use of a rubber-containing or rubber-modified styrenic resin (a rubber-reinforced styrenic resin or a copolymer in which a styrenic monomer is grafted to a rubber component) dramatically improves the impact resistance of a molded article. The rubber-containing styrenic resin includes a rubber-reinforced styrenic resin in which a rubber component is incorporated into the styrenic resin by blending, a graft or block copolymer in which a rubber component is introduced into the styrenic resin by copolymerization, and so on. The rubber components exemplified in the section of the acrylic resin A can be utilized. In the rubber-modified styrenic resin, the content of the rubber component is, for example, about 5 to 70% by weight, preferably about 10 to 50% by weight, and more preferably about 20 to 40% by weight.

Preferable styrenic resins B include polystyrene; poly(α-methylstyrene); styrene-acrylonitrile copolymer (AS resin); rubber-modified styrenic resins such as a styrene-butadiene copolymer, a styrene-acrylonitrile-butadiene copolymer (an ABS resin), an α-methylstyrene-modified ABS resin and an imide-modified ABS resin; a styrene-maleic, anhydride copolymer (SMA); and a styrene-(meth)acrylic acid ester-butadiene copolymer disclosed in Japanese Patent Application Laid-Open No. 112968/1996(JP-A-8-112968). In order to hold the balance between the whiteness of the marking and the impact resistance of the molded article, it is desirable to use a polymer containing styrene as a constitutive monomer, in particular, a rubber-modified styrenic resin (e.g. ABS resin, modified ABS resin) comprising styrene, as the constitutive monomer, and a rubber component.

It is especially preferred to use, as the styrenic resin B, an acrylonitrile-butadiene-styrene copolymer, or a mixture of an acrylonitrile-butadiene-styrene copolymer and an acrylonitrile-styrene copolymer. In the whole of the monomers for forming the styrenic resin (except for rubber components), the ratio of the acrylonitrile monomer unit relative to the styrenic monomer unit (the former/the latter, by weight) is, for instance, in the range of about 15/85 to 28/72, and preferably about 17/83 to 26/74. The ratio of the former/the latter (by weight) in the styrenic resin B may practically be in the range of about 15/85 to 25/75 (for example, about 18/82 to 24/76). For applications as a heat-resistant article, a heat-resistant ABS resin can be employed with advantage, including an α-methylstyrene-modifiedABS resin which is ABS resin compolymerized with α-methylstyrene and an imide-modified ABS resin which is ABS resin copolymerized with an imide monomer. The styrenic resin B can be used independently or as a mixture of two or more.

In this styrenic resin B, the number average molecular weight of (a) a polymer constituting the styrenic resin B or (b) a matrix component is, for instance, about 20,000 to 100,000 (e.g., 30,000 to 100,000), being determined for (a) the polymer, provided that the polymer is a homogeneous resin, or (b) the matrix component, provided that the polymer constituting the styrenic resin B is a heterogeneous resin composed of a continuous phase of the matrix component and a disperse phase. The number average molecular weight is preferably about 30,000 to 80,000, and more preferably about 30,000 to 50,000. By way of example, (i) an ABS resin, or (ii) a mixture of an ABS resin and an AS resin is used as the styrenic resin B. When (a) the ABS resin is a homogeneous resin, it is desirable that the number average molecular weight of the ABS resin [in the case of (ii), the number average molecular weight of either the ABS resin or the AS resin (preferably, both the ABS resin and the AS resin)] stays in the above range. When (b) the ABS resin is a heterogeneous system (a two-phase system) resin in which the rubber component (polybutadiene) is dispersed in the matrix component (an acrylonitrile-styrene copolymer), it is desirable that the number average molecular weight of the matrix component [in the case of (ii), the number average molecular weight of either the matrix component or the acrylonitrile-styrene copolymer (preferably, both the matrix component and the acrylonitrile-styrene copolymer)] lies in the above range.

If the number average molecular weight is below 30,000, the impact resistance of the resin composition tends to be deteriorated. And if the number average molecular weight exceeds 100,000, the resultant resin composition has not only an excessively high melt viscosity just to sacrifice moldability, but also an insufficient compatibility with the acrylic resin A only to result in the drop of the strength or external deficiency such as flow marks.

By keeping the difference between the number average molecular weights of the acrylic resin A and the styrenic resin B, the compatibility between the acrylic resins A and styrenic resin B improves drastically. As a consequence, the strength of the resin composition is enhanced and the external deficiency such as flow marks is inhibited. The difference between the number average molecular weight of the resin A [Mn(A)] and that of the resin B [Mn(B)], Mn [=|Mn(A)-Mn(B)|], is, for example, not higher than 80,000, preferably not higher than 70,000, and more preferably not higher than 68,000 (in particular, 65,000 or less).

The ratio of the acrylic resin A to the styrenic resin B, A/B (by weight), is about 1/99 to 99/1, preferably about 10/90 to 90/10, and more preferably about 20/80 to 80/20 (e.g. 30/70 to 70/30). The ratio of A/B may practically be in the range of about 25/75 to 75/25 (e.g., 40/60 to 60/40).

In terms of the balance among the whiteness of the marking, mechanical strength properties (particularly, the impact resistance) and moldability, it is desirable that the acrylic monomer, in particular, (meth)acrylic acid and/or (meth)acrylic acid ester, amounts to, as a whole, about 10 to 90% by weight of the monomers constituting the acrylic resin A and the styrenic resin B. The ratio is preferably about 20 to 80% by weight (e.g., 30 to 70% by weight).

[Black Dye or Pigment C]

An organic or inorganic dye or pigment in black or dark colours can be employed as the black dye/pigment C. The black dye/pigment C absorbs laser beams (e.g. wavelength of 354 to 1064 nm) and converts them into thermal energy, the energy making the resin foam or craze to develop white markings.

Examples of the black dye/pigment C include a carbon black (e.g. acetylene black, lamp black, thermal black, furnace black, channel black), graphite, titanium black and black iron oxide. A carbon black is strongly recommended for dispersibility, colour development and the cost. The black dye/pigment C is used singly or in combination.

The average particle size of the black dye/pigment C can be selected from a wide range of about 10 nm to 3 $\mu$m (preferably, 10 nm to 1 $\mu$m). To give an example, a carbon black, used as the black dye/pigment C, has a mean particle size of about 10 to 90 nm, preferably about 14 to 90 nm (e.g. 16 to 80 nm), and more preferably about 17 to 50 nm (e.g. 17 to 40 nm), irrespective of its production process. A black dye/pigment C with too small particle size consumes much energy for the marking, while a black dye/pigment with too large particle size is likely to end in deterioration of physical properties such as mechanical strength.

The amount of the black dye/pigment C is, for example, about 0.005 to 2 parts by weight, preferably about 0.01 to 1 part by weight. (e.g.,0.01 to 0.5 part by weight), more preferably about 0.05 to 0.5 part by weight relative to 100 parts by weight of the amount of the thermoplastic resin. When the amount of the black dye/pigment C is too little, a marking tends to be thin (faint) as a result of decreased conversion efficiency of laser beams into heat. However, when added too much, marked letters and figures may turn dark due to its excessive absorption of heat.

[Non-black Dye or Pigment D]

The non-black dye or pigment D is not specifically restricted and may be organic or inorganic, as far as being a non-black dye or pigment other than the above black dye or pigment C. As the dye or pigment D, use can be usually made of inorganic pigments.

As the inorganic pigment, there may be mentioned for example, white dyes/pigments (e.g., calcium carbonate, titanium oxide (titanium white), zinc oxide, zinc sulfide, lithopone), yellow pigments [e.g., cadmium yellow, chrome yellow, titanium yellow, zinc chromate, ocher, yellow iron oxide (mars yellow)], red pigments [e.g., invar, red iron oxide, cadmium red, minium (e.g., iron tritetraoxide, red lead)], blue pigments [e.g., Prussian blue, ultramarine, cobalt blue (Thenard's blue)], green pigments (e.g., chrome green). These pigments can be used independently or in combination.

Of these, white dyes/pigments (specifically, white pigments such as titanium oxide) is preferable, because it has an excellent hiding power and dispersibility, and enables a brighter and clearly defined white marking. This white dye/pigment is considered to scatter laser beams (e.g. wavelength 1064 nm), thereby helping the dye/pigment C to enhance the absorption efficiency of laser beams and the conversion efficiency to heat to a great extent. Therefore, the combination of the black dye/pigment C and the white dye/pigment provides a white marking with an admiring degree of whiteness. In addition, the intensity of laser beam irradiation energy can be reduced.

The average particle size (the mean particle size) of the dye/pigment D is about 0.01 to 3 $\mu$m, and preferably about 0.01 to 1 $\mu$m. Relative to 100 parts by weight of the thermoplastic resin, the amount of the dye/pigment D is about 2 parts by weight or less (e.g., about 0 to 2 parts by weight, specifically about 0.01 to 2 parts by weight), preferably about 1.8 parts by weight or less (e.g., 0.05 to 1.8 parts by weight), more preferably about 1.5 parts by weight or less (e.g., 0.1 to 1.5 parts by weight). If added too little, the dye/pigment D cannot demonstrate a sufficient scattering effect of laser beams; an excess pigment is left unreacted by laser irradiation, and the color of a marking is influenced by the pigment and has a tinge of the color of the pigment. Moreover, such excess pigment may sometimes result in deterioration in physical properties.

The total amount of the black dye/pigment C and the dye/pigment D is, for instance, about 0.1 to 5 parts by weight, preferably about 0.15 to 3 parts by weight, and more preferably about 0.2 to 2 parts by weight (in particular, 0.3 to 1.5 parts by weight) relative to 100 parts by weight of the thermoplastic resin. The amount may practically be about 0.4 to 1.2 parts by weight. By keeping the total amount of the black dye/pigment C and the dye/pigment D in the above range, the whiteness of the marking and the mechanical strength of the resulting composition are well balanced, whereby a clear white marking can be obtained with maintaining the mechanical strength at a high level. Moreover, when a white dye/pigment is used as the dye/pigment D, the ratio of the dye/pigment D to the black dye/pigment C, D/C (by weight), is, for instance, about 0.05/1 to 50/1, preferably about 0.1/1 to 20/1 (e.g., 0.1/1 to 15/1), and more preferably about 0.2/1 to 10/1.

The ratio of the amount of the colorant comprising the black dye/pigment C and the non-black dye/or pigment D (i.e., the total amount of the dyes/pigments C and D) relative to the amount of the higher fatty acid or a derivative thereof, the former/the latter (by weight), is about 0.01/1 to 2/1, preferably about 0.03/1 to 1.5/1 and more preferably about 0.05/1 to 1/1.

The resin composition of the present invention may further comprise other resin components in addition to the acrylic resin A and the styrenic resin B [e.g. polyamide, polyester, polyphenylene sulfide, polyphenylene oxide, polyacetal, polyimide, poly(ether ether ketone), polycarbonate, epoxy resin, polyurethane, unsaturated polyester], compatibilising agents, additional dyes/pigments except the dyes/pigments C and D, flame-retarders, fillers (e.g. glass fibre, carbon fibre, metal filler), stabilizers (e.g. antioxidants, ultraviolet absorbers), slipping agents, dispersing agents, foaming agents, antimicrobial agents, and others. By way of illustration, the resin composition can be coloured in a desirable colour by adding a dye/pigment other than the dyes/pigments C and D thereto. The resin composition can be high-functionalised (e.g. flame-retardant, glass-reinforced) by adding a flame-retardant or a filler.

The resin composition can be prepared by mixing the above components in a conventional mixing method (e.g. melt-kneading) using, for example, an extruder, a kneader, a mixer, or a roll.

The resin composition of the present invention can be molded into various articles according to a conventional molding process such as extrusion molding, injection molding and compression molding. Irradiation of laser beams on this molded article gives a white marking on its surface. Laser beams can be irradiated with the use of a conventional laser such as YAG laser (e.g. wavelengths 354 nm, 532 nm and 1064 nm), $CO_2$ laser, Ar laser, and Excimer laser. Among them, a YAG laser may practically be employed.

Since the resin composition of the present invention comprises a non-terpene-series higher fatty acid or a derivative thereof, white marking properties is improved. Moreover, the combination of an acrylic resin and a styrenic resin improves impact resistance and molding processability. Letters and the like can be easily marked by using laser beams instead of paints or ink, which makes the resin composition recyclable and obtainable at a lower cost. The resin composition can be used with advantage for a wide range of molded articles whose surface is marked with letters and figures, such as OA devices including keyboards of a computer or word processor, motorcar parts (e.g. button parts), household appliances, building materials, and so on.

INDUSTRIAL APPLICABILITY

A clear white marking can be obtained by irradiating laser beams on the resin composition for white marking of the present invention with its whiteness highly improved. Further, the resin composition can be clearly white-marked without losing the impact resistance of the molded article, and has excellent molding processability. In addition, the resin composition containing the white dye/pigment ensures a marking with an appreciable whiteness, even if laser beams are irradiated at a low energy intensity.

EXAMPLES

The following examples are intended to describe the present invention in further detail and should by no means be interpreted as defining the scope of the invention.

[Conditions and Evaluation Procedure of the Laser Marking]

The components indicated in the following Examples and Comparative Examples were blended and molded into a pellet by extrusion molding. A 3-mm-thick plate was made of the pellet by injection molding. White marking properties of the plate was tested by irradiating laser beams on its surface. Used as the laser was an Nd: YAG laser which gives out laser beams with a wave-length of 1064 nm.

As to the irradiation conditions, the light source current (LC), the QS frequency (QS), and the speed (SP) were changed within the ranges as shown below, with fixing the aperture at 2 mm. The whiteness was evaluated under the condition where the best white marking was obtained.

Light source current (LC): 8 to 20 A

QS frequency (QS): 1 to 10 kHz

Speed (SP): 100 to 1,500 mm/sec.

The whiteness of the marking (the degree of whitening) was visually judged and the tone of the colour was evaluated as follows.

(i) visual judgement: whiteness of the marking (alphabets and numbers were marked)

A: superior in contrast with the back ground colour

B: inferior in contrast (ii) judgement by the tone of the colour

A hundred of lines of 1 cm length were drawn at intervals of 100 $\mu$m to give box-like charts 1 cm square. The tones of the colours (L value) of these charts were measured by using colorimeter (manufactured by Nippon densyoku kogyo co., Σ80).

[Components used in Examples and Comparative Examples]

PMMA: Poly(methyl methacrylate), commercially available;

ABS resin: Prepared by a known emulsion polymerization method;

Polybutadiene (rubber component: disperse phase) content: 30% by weight

Acrylonitrile content in the matrix (continuous phase): 23% by weight

Number average molecular weight of the matrix: 32,000

Stearic acid salts: Commercially available or prepared by a known synthesizing method (reference: Kagaku kogyo shya Co. "practical handbook of additives for plastics and rubbers", page 166).

Carbon black: Commercially available product (the average particle size: 17 nm)

Titanium oxide: As a white pigment, commercially available product

Example 1

In this Example, 30 parts by weight of PMMA, 70 parts by weight of ABS, 0.5 part by weight of aluminium stearate and 0.1 part by weight of carbon black were used and the white marking property was evaluated. Under conditions of LC=12A, SP=400 mm/second and QS=4 kHz, the obtained resin composition showed its very good (laser) markability.

Examples 2 to 7

The marking property was evaluated in the same manner as in Example 1 except for the use of various stearates presented in Table instead of aluminum stearate.

Examples 8 and 9

The marking property was evaluated in the same manner as in Example 1 except for the use of 0.25 part by weight (Example 8) or 1 part by weight (Example 9) of stearate.

Example 10

The marking property was evaluated in the same manner as in Example 1 except for the addition of 0.2 part by weight of titanium oxide to the composition of Example 1.

Comparative Example

In this Comparative Example, 30 parts by weight of PMMA, 70 parts by weight of ABS and 0.1 part by weight of carbon black were used without using a stearate, the marking property was evaluated in the same manner as in Example 1. This composition is markable but the degree of whiteness was low.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 | Com. Ex. |
|---|---|---|---|---|---|---|---|---|---|---|---|
| PMMA | 30 | 30 | 30 | 30 | 30 | 30 | 30 | 30 | 30 | 30 | 30 |
| ABS | 70 | 70 | 70 | 70 | 70 | 70 | 70 | 70 | 70 | 70 | 70 |
| Aluminum stearate | 0.5 |  |  |  |  |  |  | 0.25 | 1 | 0.5 |  |
| Magnesium stearate |  | 0.5 |  |  |  |  |  |  |  |  |  |
| Calcium stearate |  |  | 0.5 |  |  |  |  |  |  |  |  |
| Barium stearate |  |  |  | 0.5 |  |  |  |  |  |  |  |
| Zinc stearate |  |  |  |  | 0.5 |  |  |  |  |  |  |
| Copper stearate |  |  |  |  |  | 0.5 |  |  |  |  |  |
| Lead stearate |  |  |  |  |  |  | 0.5 |  |  |  |  |
| Carbon black | 0.1 | 0.1 | 0.1 | 0.1 | 0.1 | 0.1 | 0.1 | 0.1 | 0.1 | 0.1. | 0.1 |
| Titanium oxide |  |  |  |  |  |  |  |  |  | 0.2 |  |
| L value | 70 | 70 | 70 | 70 | 70 | 70 | 70 | 68 | 72 | 72 | 42 |
| Visual judgment | A white | A white | A white | A white | A white | A white | A white | A white | A white | A white | B brown |

As apparent from Table 1, the compositions of Examples 1 to 10 showed their very good white-markability.

What is claimed is:

1. A resin composition for white marking comprising a thermoplastic resin, a non-terpene-series higher fatty acid or a derivative thereof and a black dye or pigment, which is capable of developing a white marking by irradiation of laser beams, wherein said thermoplastic resin comprises an acrylic resin and a styrenic resin, and the amount of said higher fatty acid or derivative thereof is 0.01 to 2 parts by weight and the amount of said black dye or pigment is 0.005 to 2 parts by weight relative to 100 parts by weight of said thermoplastic resin.

2. A resin composition for white marking according to claim 1, wherein said higher fatty acid or derivative thereof is a saturated higher fatty acid having 12 to 30 carbon atoms.

3. A resin composition for white marking according to claim 1, wherein said higher fatty acid or derivative thereof is a metal salt of the higher fatty acid.

4. A resin composition for white marking according to claim 1, wherein said higher fatty acid or derivative thereof is a metal salt of a metal selected from Group Ia metals, Group IIa metals, Group VIII metals, Group Ib metals, Group IIb metals, Group IIIb metals and Group IVb metals of the Periodic Table of Elements.

5. A resin composition for white marking according to claim 1, wherein said higher fatty acid or derivative thereof is a metal salt of a saturated aliphatic monocarboxylic acid having 12 to 28 carbon atoms and a metal selected from Group IIa metals, Group Ib metals, Group IIb metals, Group IIIb metals and Group IVb metals of the Periodic Table of Elements.

6. A resin composition for white marking according to claim 1, wherein said acrylic resin is a homopolymer or copolymer of a (meth)acrylic acid $C_{1-10}$alkyl ester.

7. A resin composition for white marking according to claim 1, wherein said styrenic resin contains at least a copolymer of a styrenic monomer and an vinyl cyanide monomer.

8. A resin composition for white marking according to claim 1, wherein said styrenic resin is a rubber-containing styrenic resin.

9. A resin composition for white marking according to claim 1, wherein said styrenic resin is an acrylonitrile-butadiene-styrene copolymer or a mixture of an acrylonitrile-butadiene-styrene copolymer and an acrylonitrile-styrene copolymer.

10. A resin composition for white marking according to claim 1, wherein the ratio of the acrylic resin to the styrenic resin, the former/the latter (by weight), is 1/99 to 99/1.

11. A resin composition for white marking according to claim 1, wherein an acrylic monomer amounts to, as a whole, 10 to 90% by weight of monomers constituting said acrylic resin and said styrenic resin.

12. A resin composition for white marking according to claim 1, wherein said black dye or pigment is carbon black.

13. A resin composition for white marking according to claim 12, wherein said carbon black has an average particle size of 10 to 90 nm.

14. A resin composition for white marking according to claim 1, which further comprises a non-black dye or pigment.

15. A resin composition for white marking according to claim 14, wherein said non-black dye or pigment is a white dye or pigment.

16. A resin composition for white marking according to claim 15, wherein said white dye or pigment is titanium oxide.

17. A resin composition for white marking according to claim 15, wherein the ratio of said non-black dye or pigment to said black dye or pigment, the former/the latter (by weight), is 0.05/1 to 50/1.

18. A resin composition for white marking according to claim 14, wherein the total amount of said black dye or pigment and said non-black dye or pigment is 0.1 to 5 parts by weight relative to 100 parts by weight of said thermoplastic resin.

19. A resin composition for white marking comprising a thermoplastic resin, a non-terpene-series higher fatty acid or a derivative thereof as an agent for improving white marking properties and a black dye or pigment, which is capable of developing a white marking by irradiation of laser beams, wherein said thermoplastic resin comprises an acrylic resin and a styrenic resin, and the amount of said higher fatty acid or derivative thereof is 0.01 to 2 parts by weight and the amount of said black dye or pigment is 0.005 to 2 parts by weight relative to 100 parts by weight of said thermoplastic resin.

20. A resin composition for white marking comprising a higher fatty acid having 14 to 24 carbon atoms or a derivative thereof, an thermoplastic resin comprising an acrylic resin and a rubber-containing styrenic resin, a black dye or pigment and a non-black dye or pigment, which is capable of developing a white marking by irradiation of a laser beam of a wavelength of 1064 nm, 532 nm or 354 nm, wherein the amount of said higher fatty acid or derivative thereof is 0.05 to 1.8 parts by weight and the amount of said black dye or pigment is 0.005 to 2 parts by weight and the amount of said non-black dye or pigment is 0 to 2 parts by weight relative to 100 parts by weight of said thermoplastic resin.

21. A resin composition for white marking according to claim 20, wherein the ratio of said acrylic resin to said rubber-containing styrenic resin, the former/the latter (by weight), is 10/90 to 90/10, the ratio of said non-black dye or pigment to said black dye or pigment, the former/the latter (by weight), is 0.1/1 to 20/1 and the ratio of the total amount of said black dye or pigment and said non-black dye or pigment relative to the amount of said higher fatty acid or derivative thereof, the former/the latter (by weight), is 0.01/1 to 2/1.

22. A molded article formed with a resin composition claimed in claim 1.

23. A method for forming a white marking on a molded article as proclaimed in claim 22 comprising irradiating laser beams on the molded article.

* * * * *